Aug. 25, 1925.

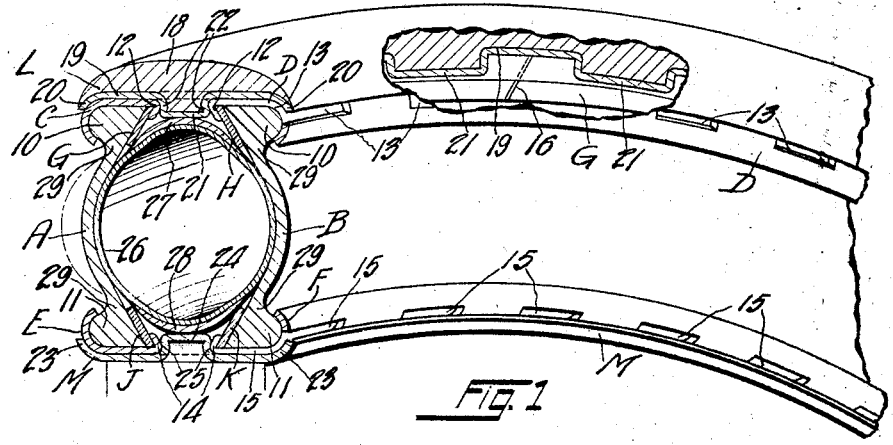
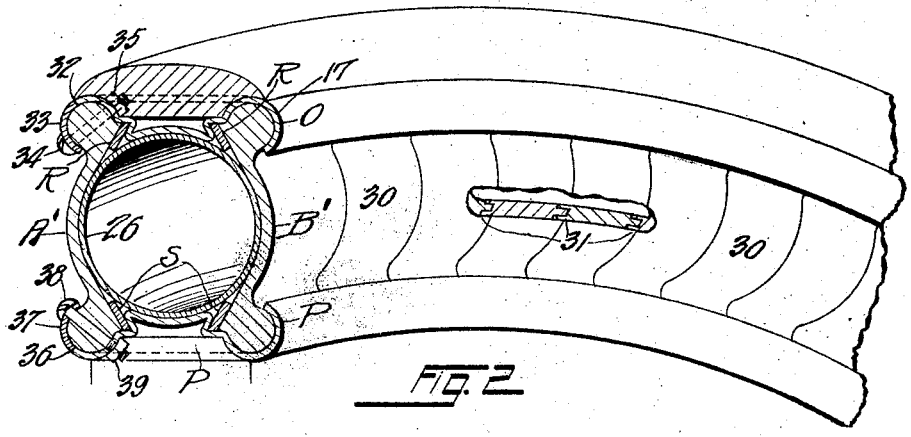

A. N. SAMMARONE

TIRE

Filed July 17, 1922     2 Sheets-Sheet 2

1,551,174

INVENTOR
A.N. Sammarone
BY
ATTORNEY

Patented Aug. 25, 1925.

1,551,174

UNITED STATES PATENT OFFICE.

AMATO N. SAMMARONE, OF AKRON, OHIO.

TIRE.

Application filed July 17, 1922. Serial No. 575,501.

*To all whom it may concern:*

Be it known that I, AMATO N. SAMMARONE, a citizen of the United States, and resident of Akron, county of Summit, and State of Ohio, have invented a new and useful Improvement in Tires, of which the following is a specification.

My invention relates to resilient tires adapted to be put upon a wheel.

The object of my invention is a resilient tire which is practically puncture proof.

Figure 3:
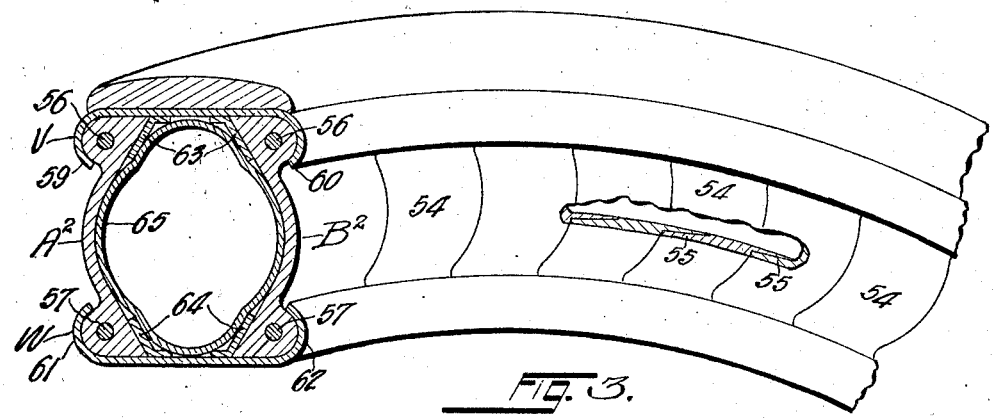
Figure 4:
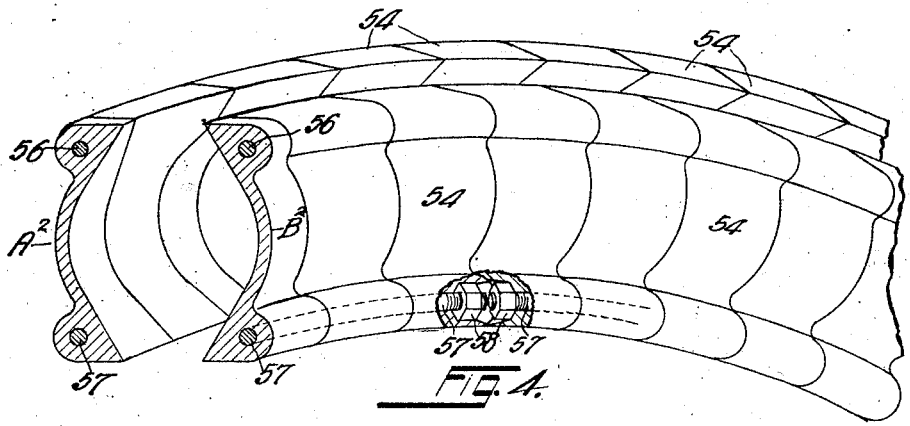
Figure 5:
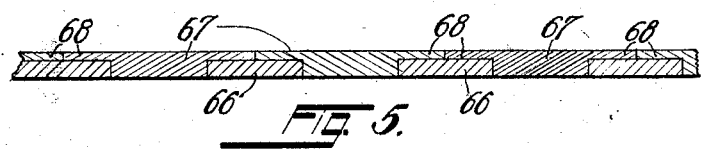

I attain this object by the mechanism shown, in three modifications, in the accompanying drawings in which Fig. 1 is a general perspective view of a portion of a tire, partly in section and having a casing composed of two halves; Fig. 2 is a general perspective view of a portion of a tire, partly in section and also having a casing composed of two halves and each half built up of sections; Fig. 3 is a general perspective view of a portion of a tire, partly in section and also having a casing composed of two halves and each half also built up of sections; Fig. 4 is a general perspective view showing a number of the casing sections of Fig. 3 assembled; Fig. 5 is a section of a number of casing sections showing another construction of overlapping casing sections.

Similar reference characters refer to similar parts throughout the views.

Referring now to Fig. 1. This tire is composed of a casing made in two halves A and B, the outer rings C and D, the inner rings E and F, the outer retainer rings G and H, the inner retainer rings J and K, the outer rim L, and the inner rim M.

The halves A and B, as well as the rings C and D, E and F, G and H, and J and K are duplicates although they appear, in the sectional views, as right and left since they are applied from opposite sides.

Each of the halves A and B is made of fabricated material as is well known in the art of making tires, and has the beads 10 and 11 substantially as shown.

Each of the outer rings C and D is made of metal and formed to suit the contour of the beads 10 and is provided with the flange 12 and has the notches 13 all the way around to provide resiliency for these rings for a purpose appearing presently.

Each of the inner rings E and F is made of metal and is formed to suit the contour of the beads 11 and is provided with the flange 14 and has the notches 15 all the way around to provide resiliency of these rings for a purpose appearing presently.

Each of the outer retainer rings G and H is made of metal, formed as a frustum of a cone and is adapted to rest against the flange 12. These rings are split by the cut 16 so that they can close in and permit of being placed inside of the outer rings C and D.

Each of the inner retainer rings J and K is made of metal, formed as a frustum of a cone, and is adapted to rest against the flange 14. These rings are split by a cut similar to the cut 16 so that they can close in and permit of being placed inside of the inner rings E and F.

The outer rim L is composed of the metal rim 19 and the tread 18, the latter preferably of rubber, being secured to the metal rim 19 and prevented from rotation thereon by the depressions therein. The rim 19 is formed with the bent down edges 20 and the alternate depressions 21 forming the shoulders 22 against which the flanges 12 of the outer rings C and D rest.

The inner rim M is made of metal and formed with the bent up edges 23 and the alternate depressions 24, similar to the depressions 21, forming the shoulders 25 against which the flanges 14 of the inner rings E and F rest.

This tire is assembled by placing the beads 10 and 11 of the half A of the casing into the outer ring C and the inner ring E. Then place the outer retainer ring G into the outer ring C and against the flange 12 as shown; the ring G being split so that it can be reduced in diameter to pass the flange 12. Then place the inner retainer ring J into the inner ring E and against the flange 14 as shown, the ring J being split also so that it can be closed in and reduced in diameter to pass the flange 14.

One half of the casing is now assembled and the other half is assembled in the same manner as the first one.

After both halves are assembled, the inner tube 26 is placed therebetween and the outer rim L is then forced over the outside of the outer rings C and D which have the notches 13 to permit the outer periphery of these rings to close in temporarily and permit the bent down edges 20 and the depressions 21 to pass thereover until the depressions 21 find their place between the flanges 12 as shown.

Then place the inner rim M over the inside of the inner rings E and F, similar to the rim L; the notches 15 being provided in the rings E and F for the same purpose as the notches 13.

The liners 27 and 28 are provided to prevent the metal parts of the tire from injuring the inner tube.

After the tire is so assembled, the inner tube is inflated whereby all parts are held in proper position.

It is noted that the casing of this tire is made in halves, not in one unit as formerly, and that the tire has an outer and an inner rim which may be formed in any suitable manner to space the inner and outer edges of both halves in proper relation with each other.

The retainer rings are provided to prevent either or both of the halves of the casing from leaving the outer or inner rings.

If these retainer rings, or equivalents thereof, are not provided, either or both of the halves A and B may, after inflation, be forced outward along their middle portions as indicated by a dot and dash line in Fig. 1 and the beads thereof will be forced out of the rings since the inflation air acts on a larger areal surface (between the inner and outer rings) and tends to force this middle portion outward while it acts on a smaller areal surface (opposite the inner and outer rings) tending to hold the halves in the rings, but since the inflation air acts with the same pressure on all surfaces, the middle portions of the halves (larger surface) will be forced outward because the edge portions of the halves (smaller surface) do not offer sufficient resistance to hold the halves in position.

The retainer rings, in combination with the inner edges of the rings, form the necks 29 which prevent the beads from passing therethrough and, consequently, retain both halves of the casing in position.

It is, of course, possible to arrange the areas of the surfaces, against which the inflation air acts, in such a manner that the resistance is as great or greater than the outward action, but such arrangement is not quite as reliable as the introduction of the retainer rings since it is not positive and may permit the halves to be blown out of the rings when the tire is in use on the road.

Referring now to Fig. 2. This tire is also composed of a casing made in two duplicate halves A' and B', the outer rim O, the inner rim P, and the retainer rings R and S. Each half A' and B' is also made of fabric but in sections 30 which are interlocked with each other as shown at 31 so that the inner tube 26 may not blow through.

The outer rim O is composed of the rubber tread and the rim 17 made of metal and formed as shown with alternate depressions and shoulders similar to those set forth in connection with Fig. 1, but has one section of each flange cut out to provide the opening 32. These openings (one in each edge) being sufficiently wide to permit each of the sections 30 to pass through when assembling this tire as will appear presently.

Each of these openings is closed, after assembly, by a cover 33 which fits into its respective opening and is held therein by the screw 34 and the nut 35 which is imbedded in the tread and bears against and is prevented from rotation by the outer rim O as shown.

The inner rim P is made of metal and formed as shown with alternate depressions and shoulders similar to those set forth in connection with Fig. 1, but also has one section of each flange cut out to provide the opening 36. These openings (one in each edge) being sufficiently wide to permit each of the sections 30 to pass through when assembling this tire as will appear presently.

Each of these openings is closed, after assembly by a cover 37 which fits into its respective opening and is held therein by the screw 38 and the nut 39 which bears against and is prevented from rotation by the inner rim P as shown.

The retainer rings R and S are similar to those set forth in connection with Fig. 1.

In order to assemble this tire, remove from one side the covers 33 and 37 of the outer and inner rims; then place the retainer rings R and S into one side of the tire; then place the sections 30 into the outer and the inner rims through the openings 32 and 36 and slide them around therein until the rims are filled completely; then put the covers 33 and 37 into place and tighten the screws 34 and 38.

Then place the inner tube into this tire and insert the retainer rings R and S into the other side of the tire. Then remove the covers 33 and 37 from this side of the tire and insert the sections 30 through the openings 32 and 36 on this side of the tire and slide them around until this side of the rims is filled completely, then put the covers 33 and 37 into place on this side of the tire and tighten the screws 34 and 38. The tire is now ready for inflation.

Referring now to Figs. 3 and 4. This tire is composed of a casing made in two halves A² and B², the outer rim V, and the inner rim W.

Each half A² and B² is made of fabric but in sections 54 which overlap each other as shown at 55.

These sections 54 are provided with beads on their outer and inner edges and with openings therein by which they are mounted on the rods 56 and 57 which are bent into circular form and provided with threads and nuts 58 on each end as seen in Fig. 5.

The outer rim V is formed with the curved in flanges 59 and 60 which fit over the outer beads on the halves A² and B².

The inner rim W is formed with the curved in flanges 61 and 62 which fit over the inner beads on the halves A² and B².

The retainer rings 63 and 64 are provided to hold the beaded portions of the halves A² and B² in position and are split, similar to those in Fig. 1, to permit of their introduction into the rims. These splits may be welded after such insertion.

This tire is assembled by stringing all of the sections of each half upon the respective rods and then tightening the nuts 58. These assembled halves then appear as shown in Fig. 4.

After both halves are so assembled, they are placed into the rims by pressing the beads of each half inward so that the central portions of the sections 54 bulge outward and the inner edges of these beads pass through between the inner edges of the flanges 60 and 62, or 59 and 61 as the case may be. The inner tube 65 is placed into the tire after one of the halves is installed and before the second half is placed into position.

The inner tube 65 will, upon inflation, hold the sections of both halves in position.

It is noted that, in this arrangement, the areal surface between the rim flanges is less than the areal surface of the beaded portions of the halves so that the inflation air holds the halves in position.

Referring now to Fig. 5 which shows another joint between the sections of the halves of the tire casing.

This joint differs from that shown in Fig. 3 at 55 in that the sections are not duplicates and that the outer sections 66 only overlap the inner sections 67 as shown in longitudinal section in Fig. 5.

The sections 66 and 67 both have the beads similar to the beads previously shown and are otherwise similarly constructed cross-sectionally.

In this instance, the sections 67 have the reduced portions 68 and the sections 66 fit over these reduced portions thus forming a substantially continuous surface for the inner tube 65 to bear against.

Other modifications may be made within the scope of the appended claims. Therefore, without limiting myself to the precise construction shown and described,

I claim:—

1. A tire comprising, a metallic outer ring having inwardly extending arcuate flanges, a metallic inner ring having inwardly extending arcuate flanges, a tire casing compoed of two halves each having beads resting in the respective of said flanges, a pair of outer retainer rings contacting the inside surface of said outer ring and movable transversely therein and contacting the inside surface of the outer edges of said halves, a pair of inner retainer rings contacting the inside surface of said inner ring and movable transversely therein and contacting the inside surface of the inner edges of said halves, and both of said pairs of retainer rings moved against said inside surfaces of the halves upon inflation of an inner tube in the tire.

2. A tire comprising, a metallic outer ring having inwardly extending arcuate flanges and depressions to retain a tire tread a metallic inner ring having inwardly extending arcuate flanges, a tire casing composed of two halves each having beads resting in the respective of said flanges, a pair of outer retainer rings contacting the inside surface of said outer ring and movable transversely therein and contacting the inside surface of the outer edges of said halves, a pair of inner retainer rings contacting the inside surface of said inner ring and movable transversely therein and contacting the inside surface of inner edges of said halves, and both of said pairs of retainer rings moved against said inside surfaces of the halves upon inflation of an inner tube in the tire.

3. A tire comprising, a metallic outer ring having inwardly extending arcuate flanges, a metallic inner ring having inwardly extending arcute flanges, a tire casing composed of two halves, each of said halves composed of sections, each of said sections provided with a bead on each radial end thereof and these beads resting in the respective of said flanges, an adjustable rod through each of the complementary of said beads to confine said sections in position, a pair of outer retainer rings contacting the inside surface of said outer ring and movable transversely therein and contacting the inside surfaces of the outer ends of said sections, a pair of inner retainer rings contacting the inside surface of said inner ring and movable transversely therein and contacting the inside surfaces of the inner ends of said sections, and both of said pairs of retainer rings moved against said inside surfaces of the sections upon inflation of an inner tube in the tire.

4. As a new article of manufacture, a metallic skeleton for a tire, comprising, an outer ring having flanges bent inward arcuately on each edge thereof, an inner ring having flanges bent inward arcuately on each edge thereof, said arcuate flanges adapted to confine a tire casing, a pair of duplicate outer retainer rings contacting the inner surface of said outer ring and movable transversely therein and each abutting the inside surface of the tire casing, a pair of duplicate inner retainer rings contacting the inner surface of said inner ring and movable transversely therein and each abutting the inside surface of the tire casing, and both of said pairs of retainer rings moved against the inside surface of casing upon inflation of an inner tube in the tire.

AMATO N. SAMMARONE.